(12) United States Patent
Anderson

(10) Patent No.: US 6,508,260 B2
(45) Date of Patent: Jan. 21, 2003

(54) VEHICLE WASHING SYSTEM

(75) Inventor: Peter J. Anderson, Lewisville, TX (US)

(73) Assignee: Hydrobotic Technologies, Inc., Roanoke, VA (US)

(*) Notice: Subject to any disclaimer, the term of this patent is extended or adjusted under 35 U.S.C. 154(b) by 62 days.

(21) Appl. No.: 09/794,575

(22) Filed: Feb. 27, 2001

(65) Prior Publication Data

US 2002/0117193 A1 Aug. 29, 2002

(51) Int. Cl.[7] .................................................. B60S 3/04
(52) U.S. Cl. ........................................ 134/113; 134/123
(58) Field of Search ............................ 134/123, 45, 113

(56) References Cited

U.S. PATENT DOCUMENTS

| | | |
|---|---|---|
| 2,083,634 A | 6/1937 | Brackett |
| 2,676,600 A | 4/1954 | Vani et al. |
| 3,072,131 A | 1/1963 | Di Laurenzio |
| 3,391,701 A | 7/1968 | Richardson et al. |
| 3,459,203 A | 8/1969 | Pritchard |
| 3,496,908 A | 2/1970 | Bernardi |
| 3,543,774 A | 12/1970 | Trasp |
| 3,604,434 A | 9/1971 | Hurst |
| 4,562,848 A | 1/1986 | Messing et al. |
| 4,716,916 A | 1/1988 | Hodge |
| 4,718,439 A | 1/1988 | Gorra et al. |
| 4,794,938 A | 1/1989 | Petit |
| 4,977,000 A | 12/1990 | Murayama et al. |
| 5,033,490 A | 7/1991 | Wade et al. |
| 5,040,485 A | 8/1991 | Bailey et al. |
| 5,161,557 A | 11/1992 | Scheiter, Jr. |
| 5,226,436 A | 7/1993 | Kirby |
| 5,452,859 A | 9/1995 | Flaxman |
| 5,645,895 A | 7/1997 | Murayama et al. |

*Primary Examiner*—Philip Coe
(74) *Attorney, Agent, or Firm*—Gardere Wynne Sewell LLP

(57) ABSTRACT

An automotive vehicle washing system includes a frame comprising a bridge member end opposed and support sections mounted for linear reciprocating movement on spaced apart support rails. Pivoting washing nozzle support arms are mounted on the bridge section and are interconnected by a drive motor and drive pulleys to move in opposite directions to wash the sides and opposite ends of a vehicle. Each arm includes movable arm sections supporting spaced apart nozzle assemblies which may move toward each other or away from each other to size a vehicle according to its width. Each arm includes opposed elongated beam members which also provide fluid conducting passages for conducting washing fluids to the nozzle assemblies. Certain ones of the nozzle assemblies are drivenly connected to an oscillating servomotor. The servomotor is also used to position the pivoting arm sections through a lost motion coupling and a gear drive unit.

27 Claims, 13 Drawing Sheets

VEHICLE WASHING SYSTEM

FIELD OF THE INVENTION

The present invention pertains to an automotive vehicle washing system including opposed remotely controlled spray nozzle support arms mounted for pivotal movement on a frame which traverses along opposed support rails to carry out a vehicle washing cycle.

BACKGROUND OF THE INVENTION

Automotive vehicle washing systems of various types are known. Two basic systems have been developed, one comprising so called contact types wherein brushes or pads come into physical contact with the vehicle body to perform the washing function. The second type of system widely used is commonly referred to in the art as non-contact or touchless systems. Still further, so-called tunnel or drive through washing systems of both types are well known as well as so-called rollover systems wherein the vehicle remains stationary in the wash bay and the system moves with respect to the vehicle to perform the washing operation.

Non-contact or touchless type washing systems, which move with respect to a stationary vehicle during the wash cycles, have certain advantages. However, prior art systems of this type have been configured such that they are subject to damage by vehicles which enter the wash bay improperly and collide with certain components of the system. Moreover, several improvements have been sought for in-bay automatic vehicle wash systems to improve the effectiveness of cleaning the entire vehicle surface, improve operational life of the system, increase the speed of the wash process and provide a visually appealing apparatus. Still further, improvements have been sought to minimize the risk of damage to any part of the washing system from collision with a vehicle as the vehicle enters or exits the wash bay, provide for application of wash chemicals and rinse water effectively to all parts of the vehicle, provide all-weather use of the system and to minimize maintenance requirements for the system while also providing a fast and effective washing cycle. It is to these ends that the present invention has been developed.

BRIEF SUMMARY OF THE INVENTION

The present invention provides an improved vehicle washing system of the general type which does not contact the vehicle and is adapted to move relative to a vehicle disposed stationary in a washroom or bay.

In accordance with one aspect of the present invention a moveable vehicle wash system is provided which is configured to be supported on opposed linear support rails mounted within a wash bay in such a way as to minimize the risk of collision between the wash system and a vehicle as the vehicle is driven into and out of the wash bay. The wash system includes a frame which is mounted on the opposed parallel support rails a suitable height above the vehicle driveway surface so as to minimize the chance of collision with a vehicle as it is driven into and out of the wash bay.

In accordance with another aspect of the invention a vehicle wash system is provided which includes a frame comprising a bridge-like structure spanning a wash bay driveway and which is enclosed in a shroud or enclosure formed of plural shell-like cover members. The enclosure is pressurized with low pressure dry and heated air to minimize the risk of corrosion to the working parts of the system and to improve all-weather operating capability of the system, particularly at ambient temperatures below the freezing point for water.

In accordance with another aspect of the invention, a vehicle wash system is provided with a bridge-like frame structure which is supported on spaced apart elongated guide rails and includes all of the system drive mechanism and opposed moveable wash nozzle support arms supported substantially above a wash bay driveway and configured to be substantially out of the way with respect to a vehicle passing into the wash bay so as to minimize the chance of collision with a vehicle to be washed and damage to the drive mechanism. Moreover, the arrangement of opposed pivotable support arms for the washing nozzles is such that the system requires minimal linear reversible travel along the guide rails in order for the system to provide a complete washing cycle covering both sides and both ends of a vehicle. Still further, the frame construction for the vehicle wash system is particularly stiff and stable in operation.

In accordance with still another aspect of the invention, a vehicle wash system is provided with opposed moveable support arms for supporting an array of spray nozzles for spraying wash fluids including surfactant solutions, vehicle appearance enhancing chemicals and rinse water on a vehicle as the system moves relative to the vehicle. Wash fluids are conveyed to the spray nozzles through passages formed in spaced apart structural members of the support arms. A unique array of spray nozzles is mounted on the opposed support arms and operably connected to a drive mechanism which is operable to selectively rotate or oscillate the spray nozzles. The nozzle drive mechanism is also operable to position the support arms in proximity to vehicles of various sizes to more effectively clean the vehicle during a wash cycle.

The present invention also provides a vehicle washing system having an improved configuration for connection to sources of washing fluids, produces complex washing functions includes a relatively uncomplicated mechanical structure, includes a configuration of moveable nozzle support arms which provide for integral fluid conducting passages as well as passages for the routing of electrical conductors and other fluid conduits, as needed, and a drive mechanism for traversing the system linearly along opposed elevated support and guide rails.

Those skilled in the art will further appreciate the above-mentioned advantages and superior features of the invention together with other important aspects thereof upon reading the detailed description which follows in conjunction with the drawings.

DETAILED DESCRIPTION OF A PREFERRED EMBODIMENT

Figure 1:
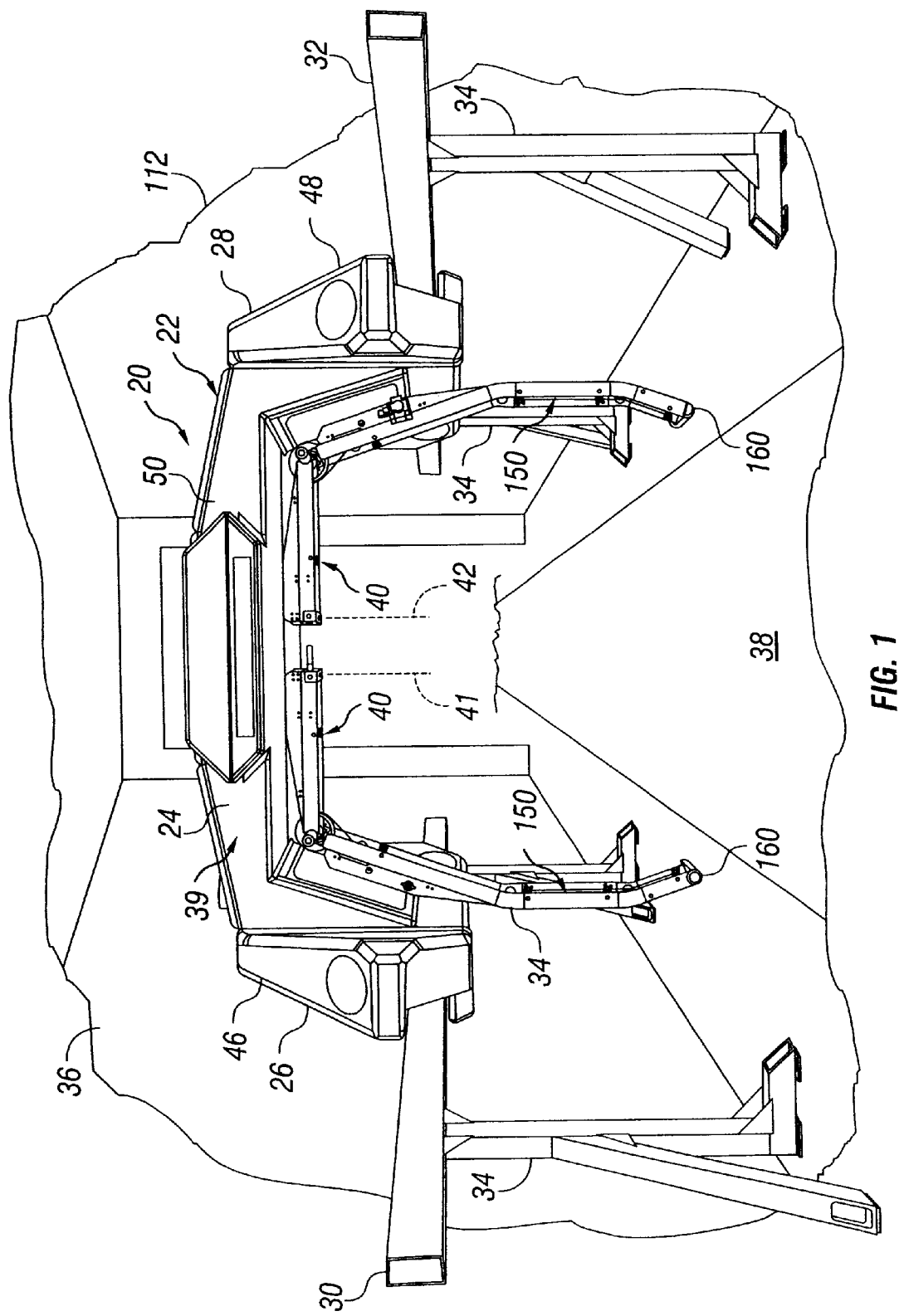
FIG. 1 is a perspective view of the vehicle washing system of the invention taken generally from the perspective of a vehicle approaching a wash bay in which the system is disposed.

In the description which follows like parts are marked throughout the specification and drawing with the same reference numerals respectively. The drawing figures are not necessarily to scale and certain features may be shown in generalized or schematic form in the interest of clarity and conciseness.

Figure 2:
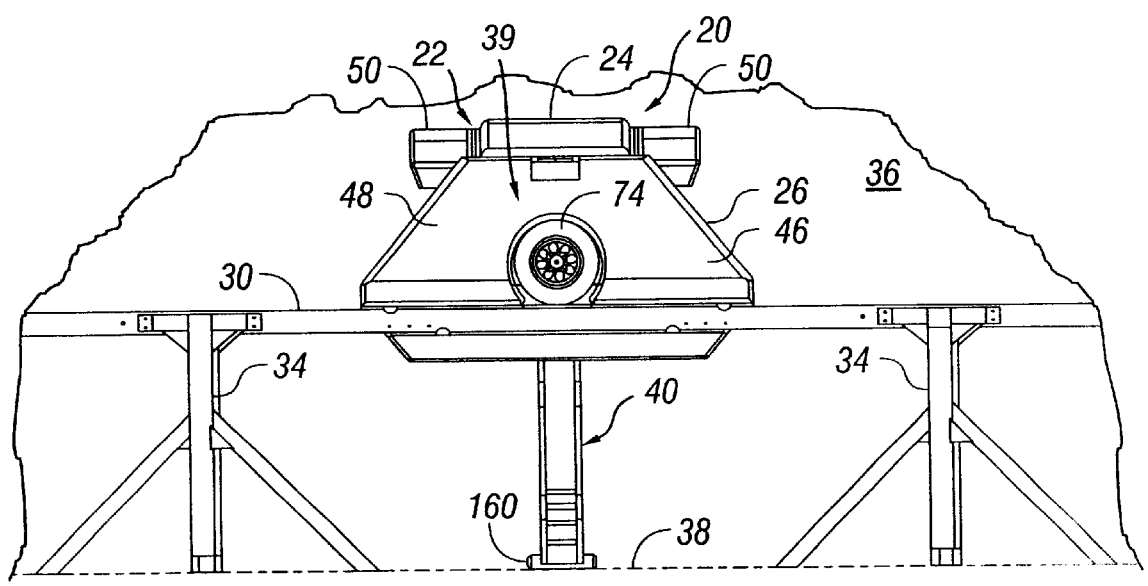
FIG. 2 is a side elevation of the system shown in FIG. 1.

Referring to FIGS. 1 and 2, a vehicle washing system in accordance with the present invention is illustrated and generally designated by the numeral 20. The washing system 20 is characterized by a linearly traversable frame 22 comprising a bridge section 24 and opposed support sections 26 and 28, see FIG. 3 also. The frame 22, including support sections 24, 26 and 28, is adapted for linear reciprocating movement along opposed, generally rectangular cross section, guide and support rails 30 and 32, FIG. 1, which are mounted on suitable support legs 34, spaced apart within a wash room or wash bay 36, also as shown in FIG. 1. Wash room or bay 36 includes a vehicle driveway 38 into which a motor vehicle, not shown, may be driven and stopped at a predetermined position so that the system 20 may traverse reversibly along the rails 30 and 32 to carry out a vehicle washing cycle.

As further shown in FIG. 1, the vehicle washing system 20 includes opposed spray nozzle support arms 40 which are mounted on frame 22 for pivotal movement about respective pivot axes 41 and 42, FIG. 1, so that, as the frame 22 traverses linearly along the rails 30 and 32 the arms 40 may be pivoted about their respective axes to wash opposite ends of a vehicle sitting on the driveway 38. Thanks to the arrangement of the support rails 32 and 34 and the frame 22 a major part of system 20 is normally not susceptible to a collision with a vehicle entering bay 36.

Figure 1A:
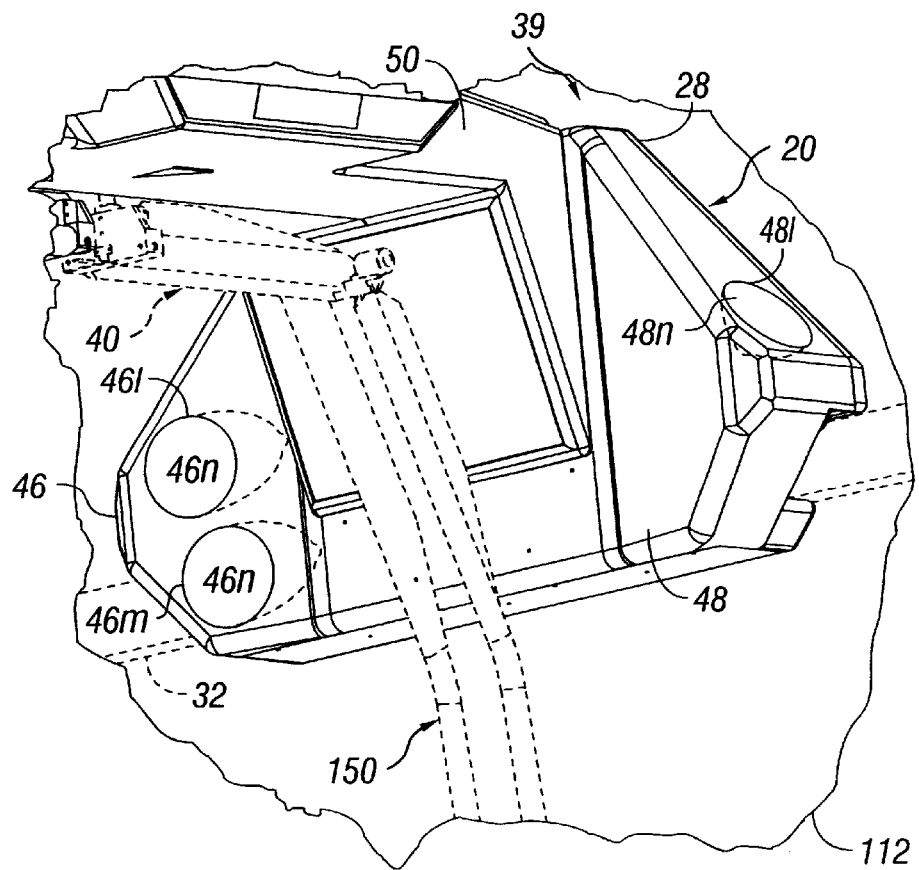
FIG. 1A is a detail perspective view of one of the end support sections of the frame showing the enclosures and an arrangement of lighting fixtures on the enclosures.

The views of drawing FIGS. 1, 1A and 2, show the frame 22 with the bridge section 24, and the opposed support sections 26 and 28 fitted with an enclosure 39 comprising lightweight shell-like fabricated or molded plastic or sheet metal cover members 46 and 48 enclosing the framework of the support sections 26 and 28 and a similar arrangement of cover members 50 enclosing the bridge section 24. The cover members 46, 48 and 50 may be removed for work on various components of the system to be described in further detail herein. However, the cover members 46, 48 and 50 form an enclosure for a major part of the vehicle washing system 20 and which may be subject to the introduction of heated, low pressure air to pressurize the space enclosed by the cover members 46, 48 and 50. In this way, vehicle washing chemical and water spray is prevented from contaminating and corroding the operating components of the system 20 within the enclosure 39 formed by the cover members 46, 48 and 50. Low pressure heated air may be introduced into the aforementioned enclosure 39 also for the purpose of minimizing the risk of fluids freezing in the fluid conduits leading to the nozzle support arms 40 when the washing system 20 is operating in weather below 32° F.

Referring briefly to FIG. 1A, as shown by way of example, the enclosure members 46 and 48 for the respective frame sections 26 and 28 are also fitted with suitable light fixtures 46l, 46m and 48l, as shown. The enclosure array for the frame section 26 is fitted with similar light fixtures forming a mirror image of the arrangement of light fixtures 46l, 46m and 48l. In this way, substantial light is projected onto a vehicle being washed and which moves with the frame 22 of the vehicle wash system 20. Moreover, the light fixtures 46l, 46m and 48l are mounted substantially within the enclosures 46 and 48 and are thus not subject to washing fluid spray except for the protective lenses 46n and 48n of the respective light fixtures, as shown.

Figure 3:
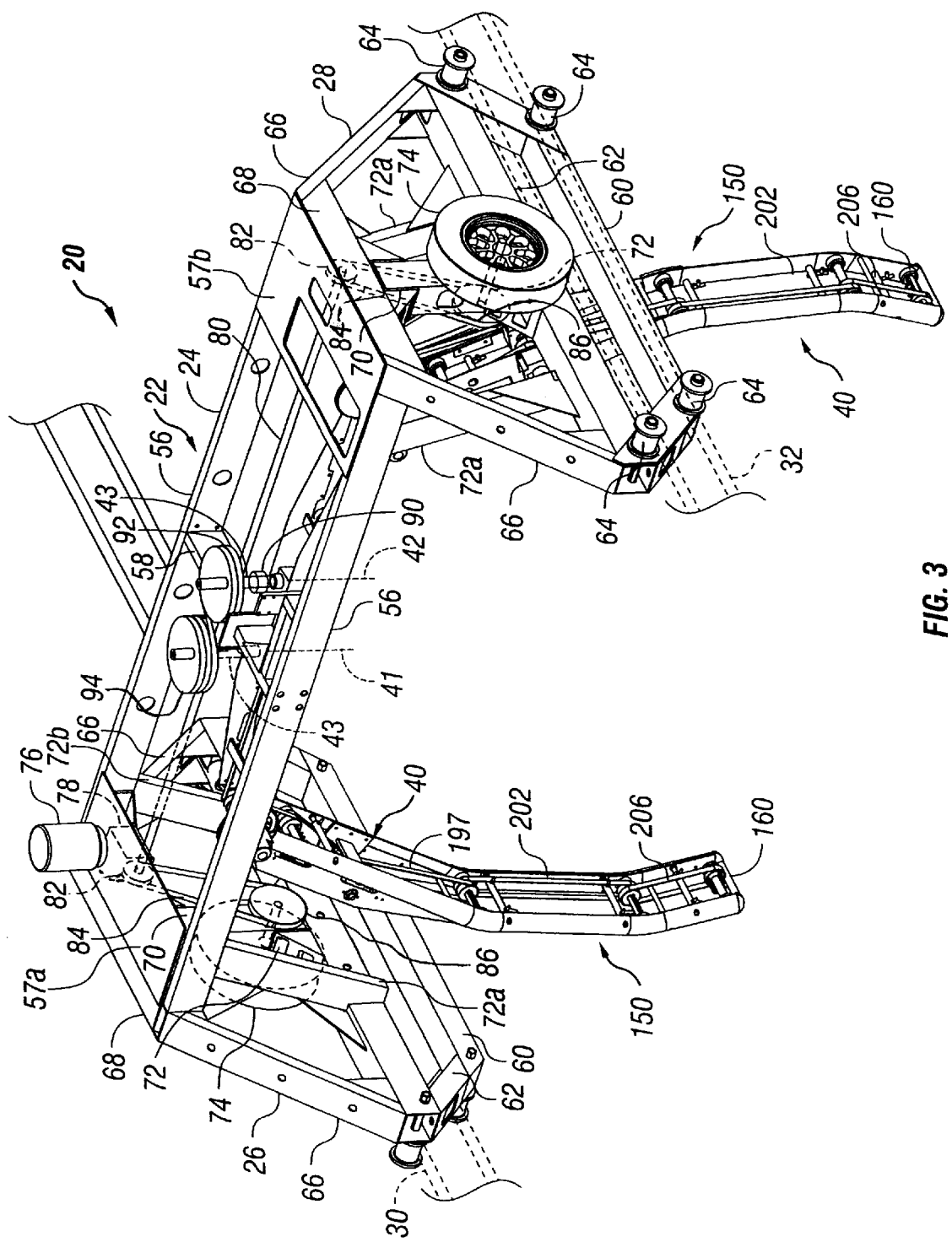
FIG. 3 is a perspective view of the vehicle washing system with the frame enclosure or cover structure removed.

Referring now to FIG. 3, the washing system 20 is shown with the cover members 46, 48 and 50 removed from the respective portions of the frame 22 including the bridge section 24 and the opposed support sections 26 and 28. The bridge section 24 includes two, spaced apart, parallel support beams 56 which extend between frame sections 26 and 28 and are suitably connected thereto, respectively. A transverse beam 58 extends between and is connected to the beams 56 at approximately their midpoints. Each of the nozzle support arms 40 includes a pivot shaft 43 mounted in suitable bearings connected to the beam 58 whereby the arms 40 may pivot about the aforementioned axes 41 and 42.

As further shown in FIG. 3, each of the frame sections 26 and 28 is characterized by suitably interconnected, spaced apart, parallel beam members 60 and 62, each of which supports spaced apart guide rollers 64, as shown. The guide rollers 64 are arranged in opposed pairs for engagement with the support rails 30 and 32 for guiding the vehicle washing system 20 along the rails 30 and 32, respectively. The frame sections 26 and 28 further include upwardly extending beam members 66, which are connected to the bridge beams 56 and to a transverse beam 68. Accordingly, the frame sections 26 and 28 are each made up, primarily, of beam members 60, 62, 66 and 68 suitably connected to each other, such as by welding. FIG. 3 further shows certain major reinforcing members for the frame 22, including spaced apart upstanding members 72a and 72b which extend between the beam members 62 and the bridge members 56 to aid in reinforcing the frame 22. Moreover, the rigidity of the frame 22 is further enhanced by opposed plate members 57a and 57b which extend between the frame members 56 and are also secured to the opposed frame members 68. Additional suitable gussets and reinforcement members shown but not described in detail herein are also provided to reinforce the frame 22.

An intermediate upstanding box beam type column member 70 for each frame section 26 and 28 is adapted to support a rotatable axle 72 for a pneumatic tired drive wheel 74. Each drive wheel 74 supports the frame 22 on an associated rail 30 and 32, as shown in FIG. 3, for traversing the system 20 along the rails in opposite directions. The drive wheels 74 are drivenly connected to a suitable reversible electric drive motor 76 which is mounted on bridge section 24 and is drivingly connected to a right angle gear drive unit 78 which is drivingly connected to an elongated cross-shaft 80 extending through a suitable clearance opening in beam 58, FIG. 3. Cross-shaft 80 is suitably mounted for rotation on the bridge section 24 of frame 22 and is supported at one end by drive unit 78 and adjacent its opposite end by a bearing, not shown, mounted on bridge section 24. Cross-shaft 80 is adapted to support opposed drive pulleys 82, respectively. Pulleys 82 are each drivingly connected to a suitable endless belt or chain 84, respectively, which is trained over a driven pulley 86 connected to an axle 72, respectively. Accordingly, the drive wheels 74 are interconnected by way of the cross-shaft 80 and the respective drive mechanisms comprising pulleys 82 and 86 and endless belts or chains 84, all drivenly connected to the motor 76 via the shaft 80.

Figure 4:
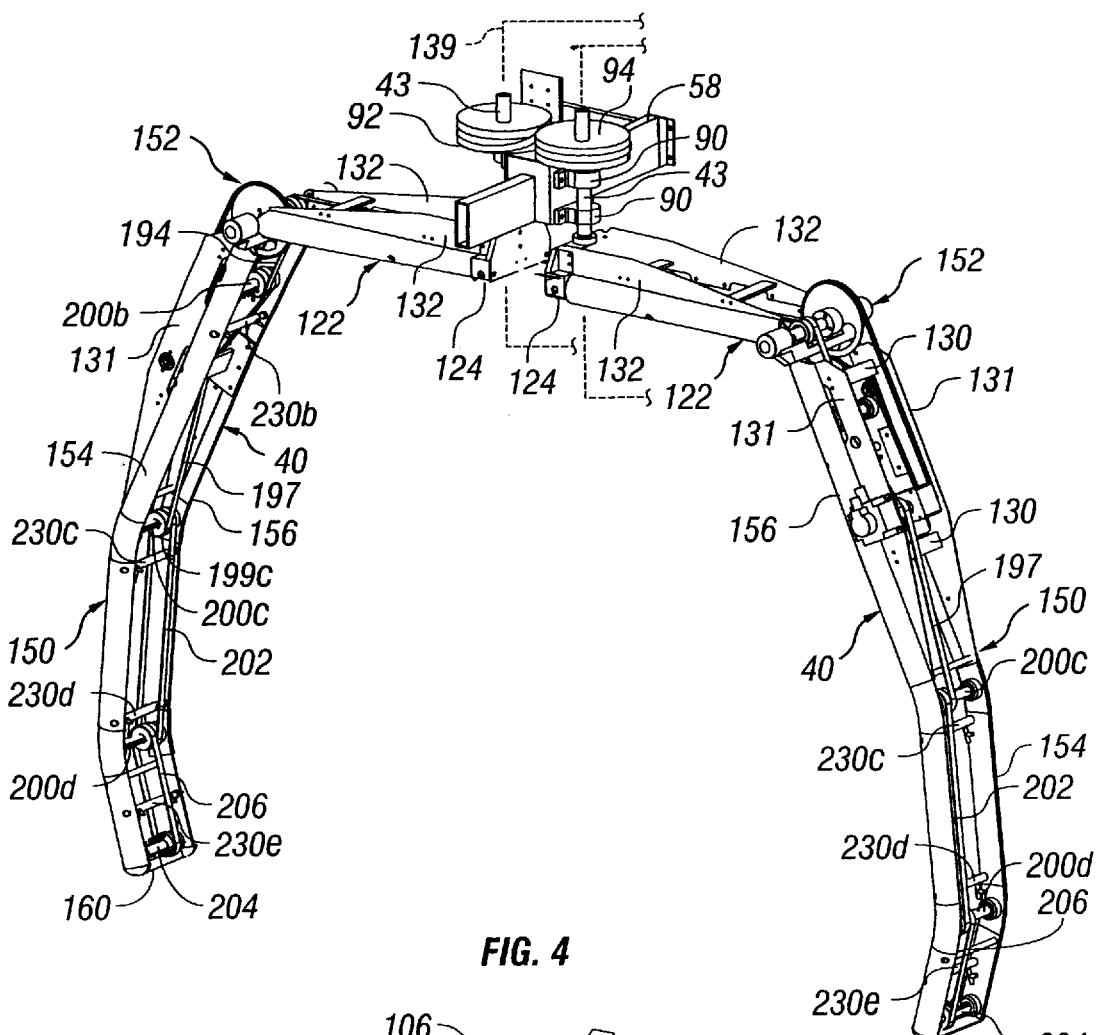
FIG. 4 is a perspective view of the opposed nozzle support arms.
Figure 4A:
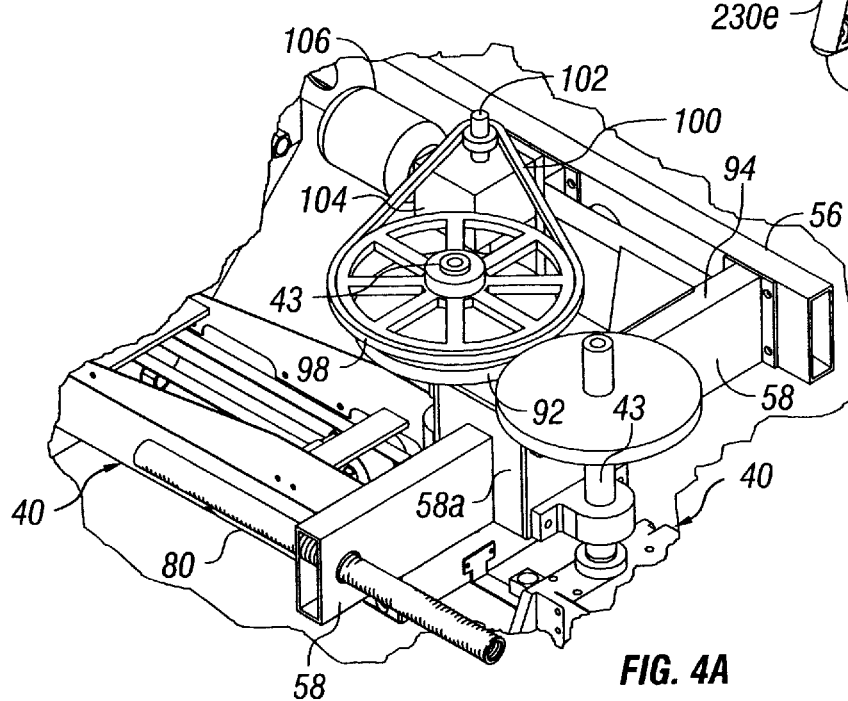
FIG. 4A is a detail perspective view showing certain portions of the support arm drive mechanism.

Referring now to FIGS. 3, 4 and 4A, the arms 40 are each supported in suitable bearings 90 mounted on the bridge section 24 for pivotal movement in opposite directions on their respective pivot shafts 43, see FIGS. 4 and 4A, in particular. Bearings 90 are suitably secured to a part 58a of frame member 58, FIG. 4. One of the pivot shafts 43 is drivenly connected to a multi grooved pulley 92, as shown in FIG. 4, and the other pivot shaft 43 is also drivenly connected to a second pulley 94 mounted thereon. Pulleys 92 and 94 are interconnected by an endless cog belt or a roller chain 96 to provide positive driving connections between the pulleys 92 and 94. Belt or chain 96 is reeved in a "figure eight" configuration around the pulleys 92 and 94 so that they effect movement of the pivot shafts 43 for their respective arms 40 in opposite directions. Intermeshing spur gears could be substituted for the pulleys 92 and 94 and belt 96.

As shown in FIG. 4A, the shaft 43 on which pulley 92 is mounted is also drivenly connected to a pulley 98 mounted thereon and engaged with an endless positive drive chain or a belt 100 drivenly connected to the output shaft 102 of a speed reduction gear drive unit 104 suitably supported on one of the beam members 56. Gear drive unit 104 is drivenly connected to a reversible electric motor 106 for effecting pivotal movement of the arms 40 about the axes 41 and 42 of their respective shafts 43 reversibly and in opposite directions.

Figure 5:
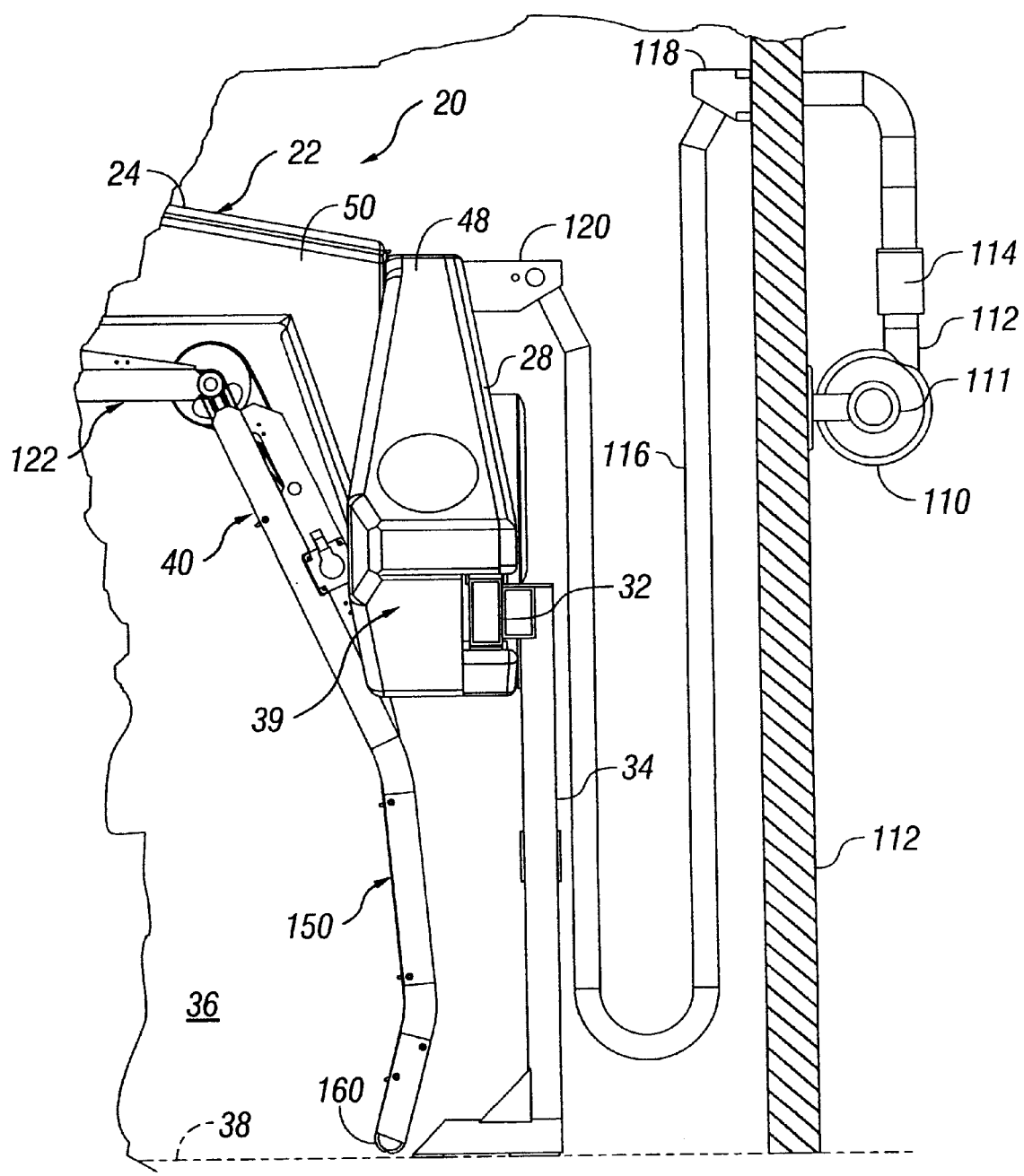
FIG. 5 is a partial end elevation view showing an arrangement of an air pressurization apparatus for the vehicle washing system.

Referring briefly to FIG. 5, major portions of the vehicle washing system 20, except for the arms 40, may be advantageously isolated from water and chemical sprays during a wash cycle thanks to the enclosure 39 provided by covers 46, 48 and 50 which substantially enclose the frame 22, including the bridges section 24 and the opposed end sections 26 and 28. As shown in FIG. 5, a motor driven low pressure air blower 110 is preferably mounted isolated from the wash bay 36, such as on the other side of a partition or wall 112 delimiting one side of the wash bay. Motor driven blower 110 includes an inlet air filter 111, a discharge duct 112 and an inline discharge air heater 114 which may be one of a suitable electric resistance type, for example. Discharge duct 112 is connected to a flexible duct or hose 116 at a suitable connector 118 mounted on the wall 112 within the wash bay 36. Air discharge hose 116 is connected to a second connector 120 mounted on frame 22 and operable to discharge air into the interior of the enclosure 39 formed by covers 48 and 46 substantially enclosing the frame section 28 as shown in FIG. 5. Each of the arms 40 may also be provided with pressurized enclosures, not shown, if desired.

The enclosure parts formed by cover members 46, 48 and 50 are in fluid flow communication with each other so that heated pressure air at a relatively low pressure of about 1.0–2.0 psig flows substantially through the enclosure 39 and prevents the invasion of water and chemical spray so that the apparatus within the enclosure remains substantially corrosion free and heated to a temperature above the freezing temperature of water. In this way the working life and reliability of the system 20 is further enhanced.

Figure 6:
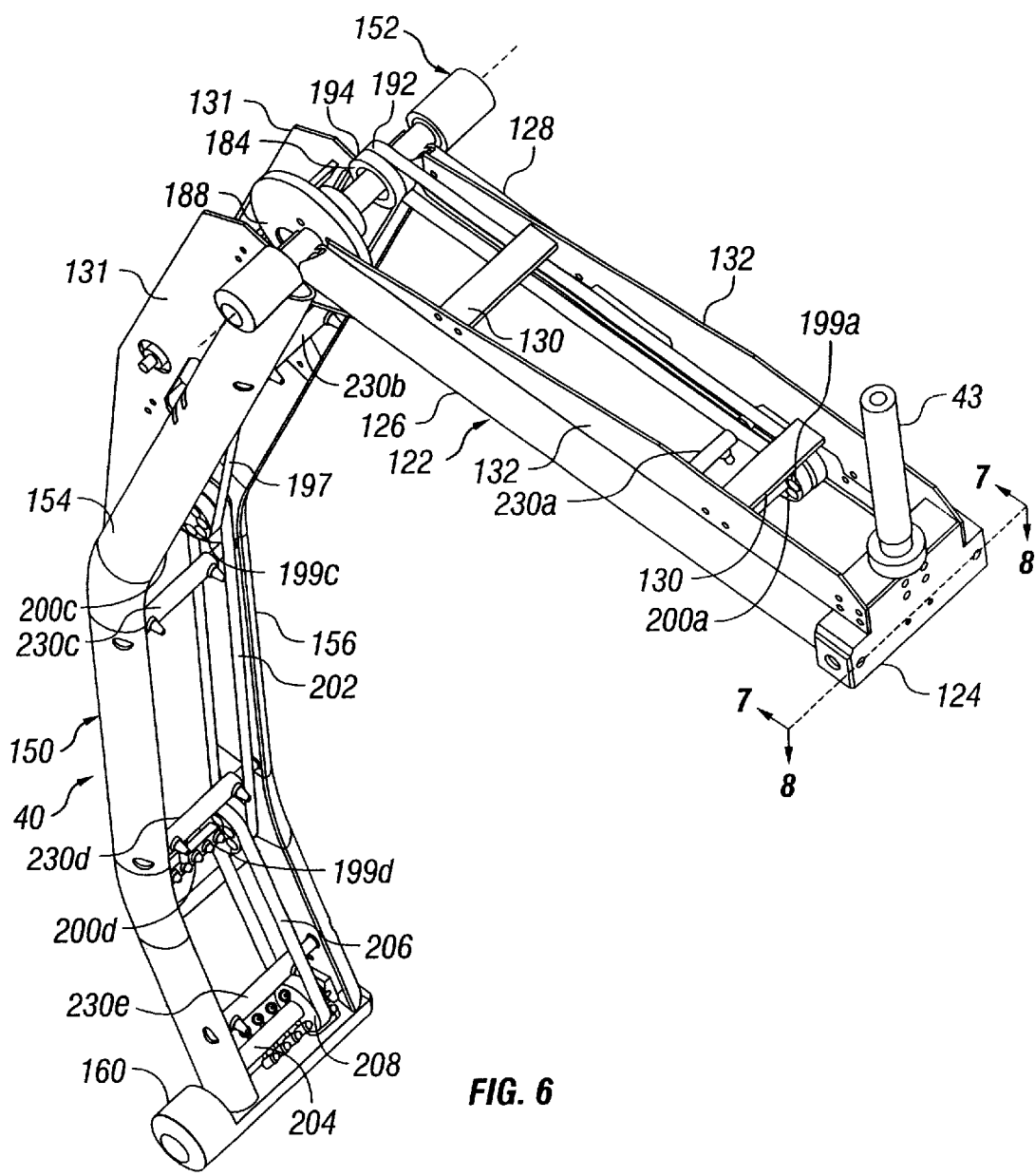
FIG. 6 is a perspective view of one of the nozzle support arms.
Figure 8:
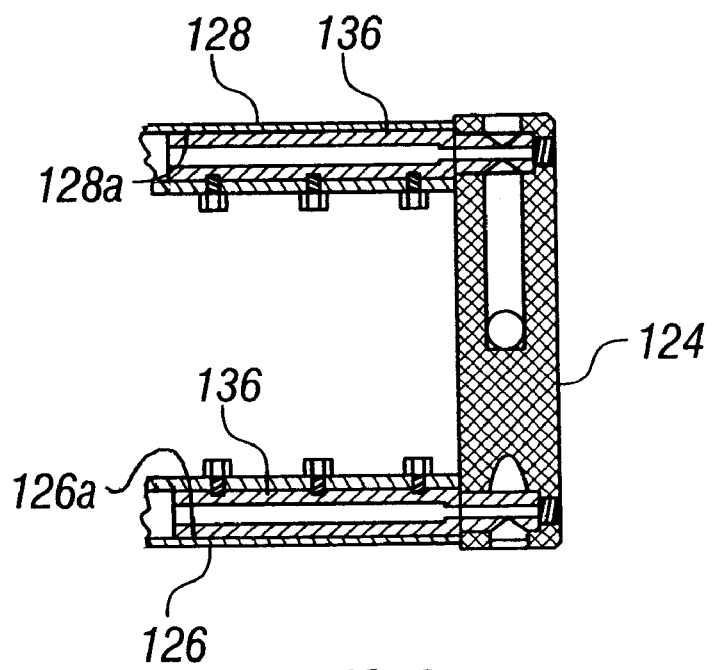
FIG 8 is a detail section view taken from the line 8—8 of FIG. 6.

Referring now to FIGS. 4 and 6, each of the arms 40 includes a first generally horizontally extending arm section 122 suitably connected to its pivot shaft 43 by a support block 124. Arm section 122 is characterized by two, spaced apart, elongated and preferably extruded aluminum beam members 126 and 128. The beam members 126 and 128 of each arm 40 are interconnected by spaced apart fixed nozzle support members 230A, a support block 124 and a pivot assembly 152. Suitable cross brace members 130 are connected directly to elongated reinforcing gusset plates 132. Gusset plates 132 are, in turn, connected to the beam members 126 and 128 by conventional mechanical fasteners, not shown, to form a substantially rigid arm section 122, see FIG. 6, in particular. Referring to FIG. 8, each of the beam members 126 and 128 includes an elongated passage formed therein and designated by the numerals 126a and 128a, respectively. Elongated tubular inserts 136 are secured to the beam members 126 and 128, extend within the passages 126a and 128a and are secured to or form a part of the block 124.

Figure 7:
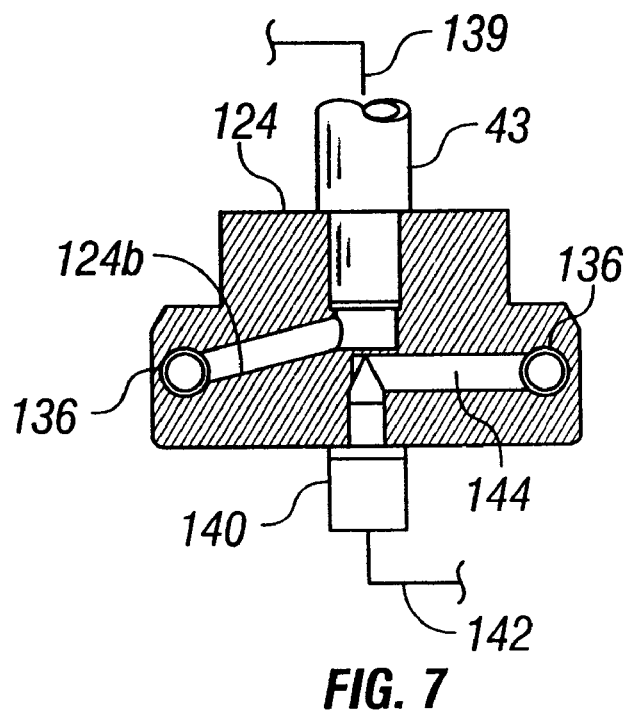
FIG. 7 is a detail section view taken from the line 7—7 of FIG. 6.

As shown in FIG. 7, pivot shaft 43 is a hollow tubular member which is operably connected to a wash fluid supply conduit 139 by way of a suitable swivel coupling, not shown. Tubular shaft 43 is suitably secured non-rotatably to the block 124. Block 124 includes an internal passage 124b operable to receive pressure fluid by way of conduit 139 and tubular shaft 43 for conducting pressure fluid through an internal passage formed in tubular member 136. In like manner a suitable swivel coupling 140 is connected to block 124 and to a fluid supply conduit 142 and is operable to conduct pressure fluid to an internal passage 144 in block 124, FIG. 7. Pressure fluid may flow from conduit 142 through coupling 140 and passage 144 through the other tubular support member 136 and into internal passage 128a of beam member 128. In this way wash fluids may be introduced to arm 40 by one flow path to passage 126a, for example, and similar or different wash fluids at similar or different pressures may be introduced to arm 40 through passage 128a in beam member 128. The arrangement of swivel connections to the block 124 and by way of the tubular support shaft 43 eliminates the requirement for flexible hoses to be strung along the arms 40 to the respective sets of spray nozzles mounted on the arms and to be described in further detail herein.

Referring further to FIGS. 4 and 6, each of the arms 40 includes a second and depending arm section 150 which is mounted for pivotal movement on and with respect to the arm section 122. A pivot assembly 152 is connected to the distal end of each arm section 122, see FIG. 6, and supports the arm section 150 for pivotal movement about a substantially horizontal axis to a selected position to be in close proximity to the side and ends of a vehicle, respectively. Suitable sensors, such as photocell type sensors, not shown, may be operable to "size" the wash system 20 as a vehicle is parked in the wash bay 36 whereby the arm sections 150 are moved inwardly or outwardly about the pivot axes of pivot assemblies 152 with respect the sides of the vehicle so as to be in predetermined positions prior to commencing a washing cycle.

Referring further to FIG. 6, each of the arm sections 150 is also formed of somewhat curved, opposed and elongated, extruded aluminum or the like, beam members 154 and 156 which are interconnected by spaced apart fixed nozzle support members 230b, 230c, 230d and 230e, see FIG. 4 also. Elongated flat plate gussets 131 are interconnected by brace members 130 and reinforce the connections between the beam members 154 and 156. Beam members 154 and 156 are also interconnected at their distal ends by a somewhat cylindrical shoe member 160, FIGS. 4 and 6.

Figure 15:
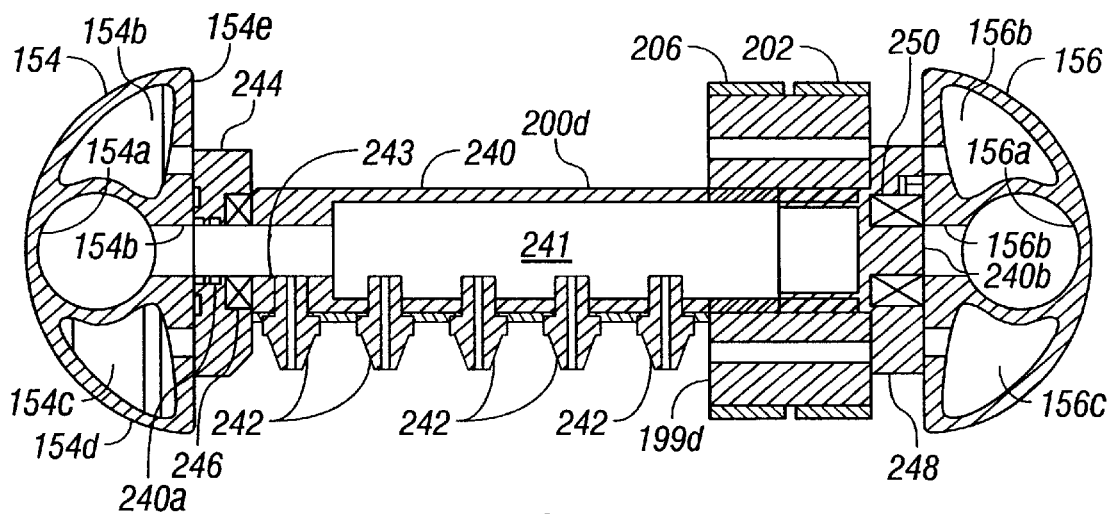
FIG. 15 is a detail section view taken generally from the line 15—15 of FIG. 13.

Referring briefly to FIG. 15, a cross section of each of the beam members 154 and 156 is illustrated. The cross sectional configuration of the beam members 126 and 128 is identical to that of the beam members 154 and 156. As shown in FIG. 15, the beam members 154 and 156 include respective elongated internal fluid conducting passages 154a and 156a, as well as coextensive cavities 154b, 154c, 156b and 156c. The passages and cavities of the beam members 154 and 156 are delimited by the geometry of the beam members which, by way of example, for beam member 154, includes a somewhat arcuate outer wall 154d intersected by a generally planar inner wall 154e. In this way structural members and other features of the vehicle washing system 20 may be easily connected to or mounted on the beam members 126, 128, 154 and 156. Moreover, the internal passages 154a and 156a are adapted to be in communication with the passages 126a and 128a, respectively, to receive wash fluids, for example, in spaced apart passages internal to the arms sections thereby eliminating the need for external hard piping or flexible hoses.

Figure 9:
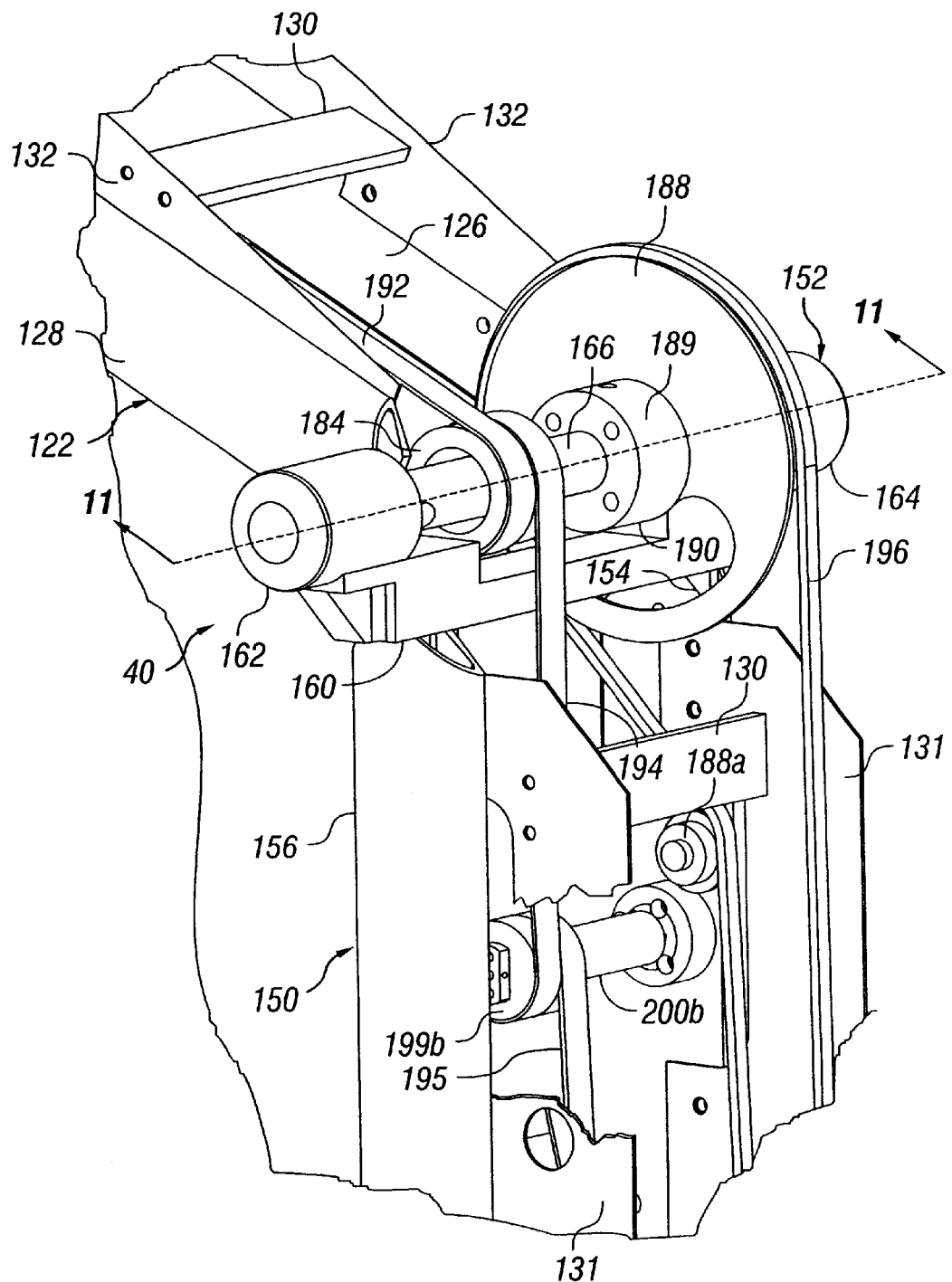
FIG. 9 is a perspective view of one of the support arms showing certain details of the pivot connection between arm sections.
Figure 10:
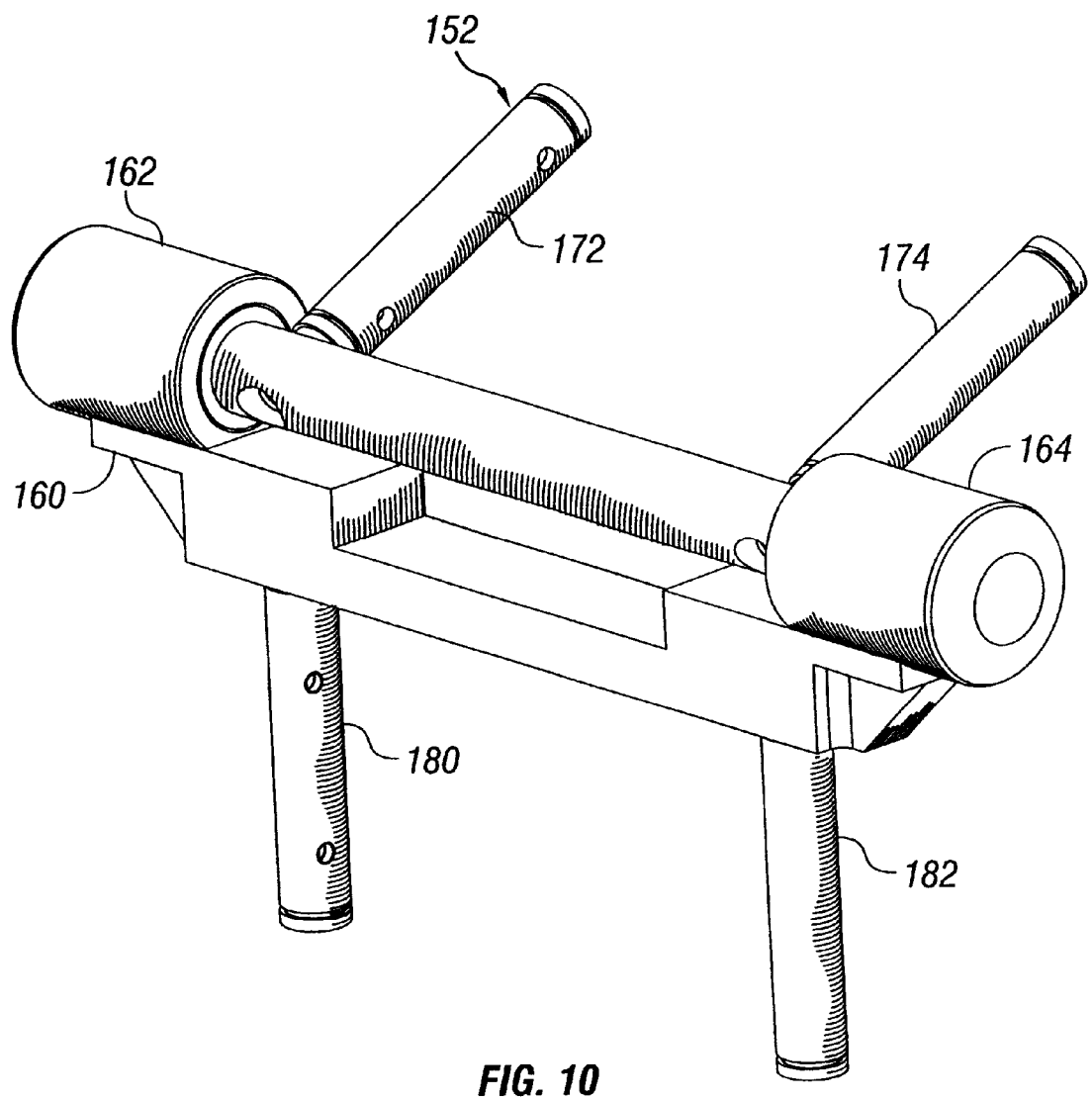
FIG. 10 is a detail perspective view of the bearing and pivot structure for the pivot connection shown in FIG. 9.
Figure 11:
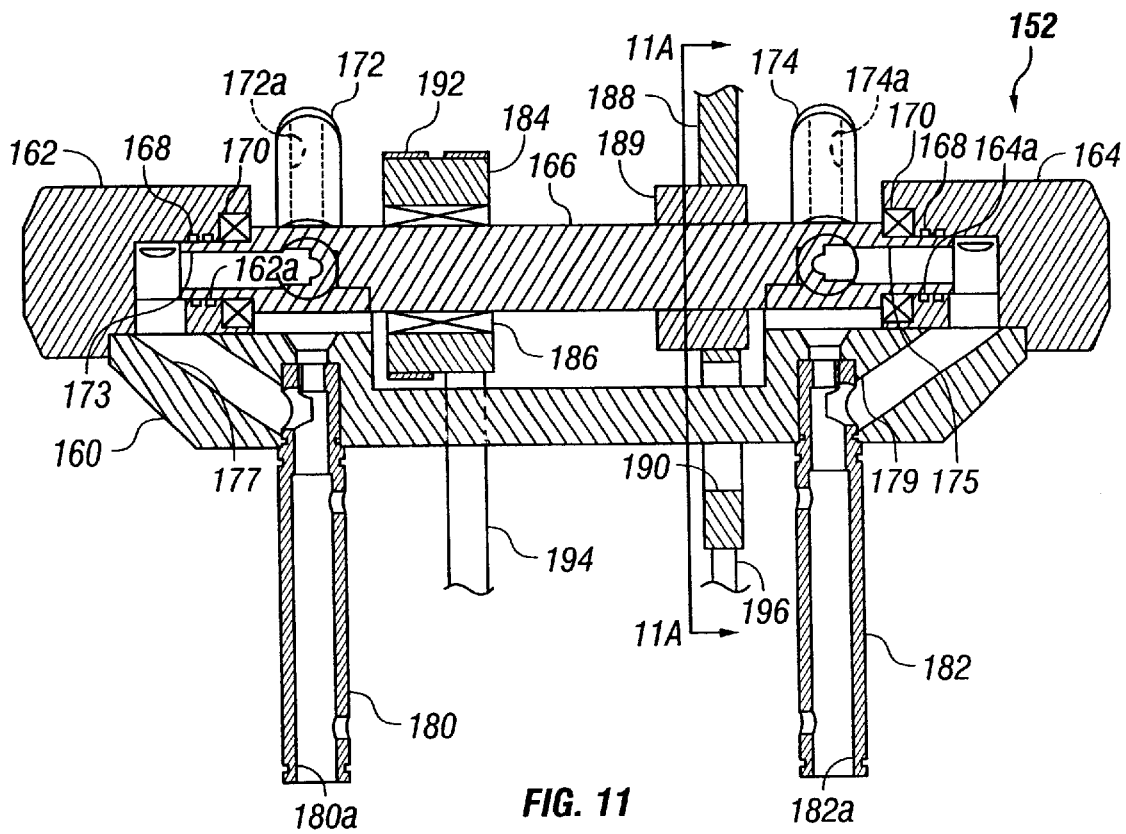
FIG. 11 is a detail section view taken generally from the line 11—11 of FIG. 9.

Referring now to FIGS. 9, 10 and 11, each pivot assembly 152 for interconnecting the respective arm sections 122 and 150, includes an elongated member 160 including opposed bearing support members 162 and 164 which journal opposite ends of a cylindrical shaft 166, see FIG. 11. Shaft 166 includes opposed trunnions 168 which project into suitable bores 162a and 164a in the members 162 and 164. Sealed antifriction bearings 170 are sleeved over the trunnions 168 and are mounted on the members 162 and 164, respectively. Shaft 166 includes spaced apart tubular support members 172 and 174 secured thereto and projecting substantially normal to the central longitudinal axis of the shaft 166. Members 172 and 174 are adapted to be disposed, respectively, in fluid tight snug fitting sleeved relationship in the passages 128a and 126a of beam members 128 and 126 and suitably secured thereto by mechanical fasteners, not shown. Suitable o-ring seals, not shown, facilitate fluid tight connections between the members 172, 174 and members 126, 128. Internal passages 172a and 174a within the tubular support members 172 and 174 are in communication with passages 173 and 175, respectively, see FIG. 11, formed in the trunnions 168. Passages 173 and 175 open to the bores 162a and 164a which are in fluid flow communication with internal passages 177 and 179 in the support member 160.

Passages 177 and 179 are in fluid flow communication with passages 180a and 182a of a second pair of tubular support members 180 and 182 which are adapted to be disposed in tight fitting sleeved relationship within the passages 156a and 154a of the beam members 156 and 154, respectively. The tubular members 172, 174, 180 and 182 are suitably secured to the beam members 128, 126, 156 and 154 by suitable fasteners, not shown. Accordingly, fluid may be transferred through the pivot assemblies 152 between the arm sections 122 and 150 to provide fluid flow throughout the length of the arm sections 150 down to the shoes 160. The passages 154a and 156a are suitably closed at the shoes 160, respectively. Accordingly, the arm sections 150 may pivot relative to the arm sections 122 about the longitudinal central axes of the shafts 166, since relative movement may be carried out between the members 162 and 164 and the shaft 166.

Figure 11A:
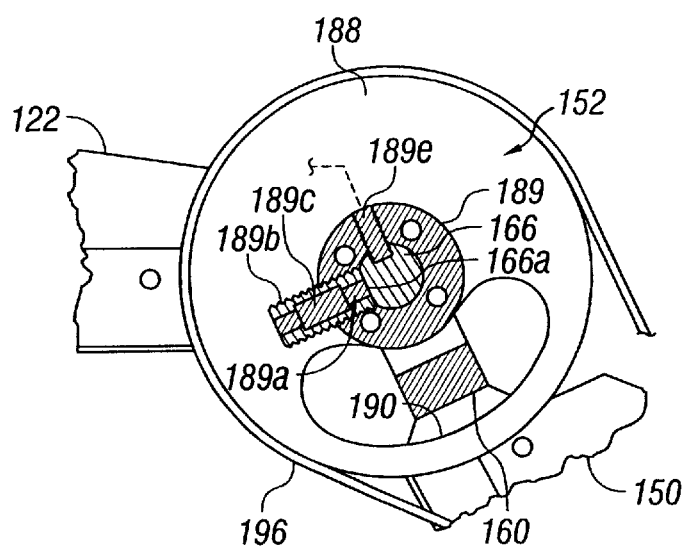
FIG. 11A is a section view taken from line 11A—11A of FIG. 11.

As further shown in FIGS. 9 and 11, a double belt pulley 184 is mounted on shaft 166 for rotation relative thereto by way of a suitable bearing 186. A relatively large diameter pulley 188 is also mounted on but is normally non-rotatable relative to shaft 166 and includes a suitable arcuate slot 190 formed therein to provide clearance for the support member 160, as shown in FIGS. 9, 11 and 11A. Endless cog belts or roller chains 192 and 194, FIG. 9, are trained over the pulley 184 and an endless cog belt or chain 196 is also trained over the pulley 188, an idler pulley 188a and a drive pulley described hereinbelow. As shown in FIG. 6, belt 192 is trained around a double belt pulley 199a for an oscillating spray nozzle assembly 200a mounted on arm section 122 and of a configuration which will be described in further detail herein. In like manner, belt 194 is trained around a double belt pulley 199b for a second oscillating spray nozzle assembly 200b mounted on arm section 150, see FIGS. 6 and 9.

Still further, an endless belt 195 is trained around a pulley 214, FIGS. 12 and 12A, drivenly connected to a servomotor to be described hereinbelow. A fourth endless cog belt or chain 197 is trained around pulley 214 and a double belt pulley 199c of a third nozzle assembly 200c mounted spaced from nozzle assembly 200b on the arm section 150, see FIG. 4 also. Pulley 199c is drivingly connected to an endless belt 202 which is trained around a double belt pulley 199d of a nozzle assembly 200d. Accordingly, the nozzle assemblies 200a, 200b, 200c and 200d are interconnected by the endless belts 192, 194, 195, 197 and 202. Lastly, a vehicle tire and rocker panel washing nozzle assembly 204 is also mounted between the beam members 154 and 156 at the distal end of each of the arm sections 150, respectively, and is interconnected with the nozzle assembly 200d by an endless belt 206 trained over the double pulley 199d of nozzle assembly 200d and a pulley 208 for nozzle assembly 204.

Figure 12:
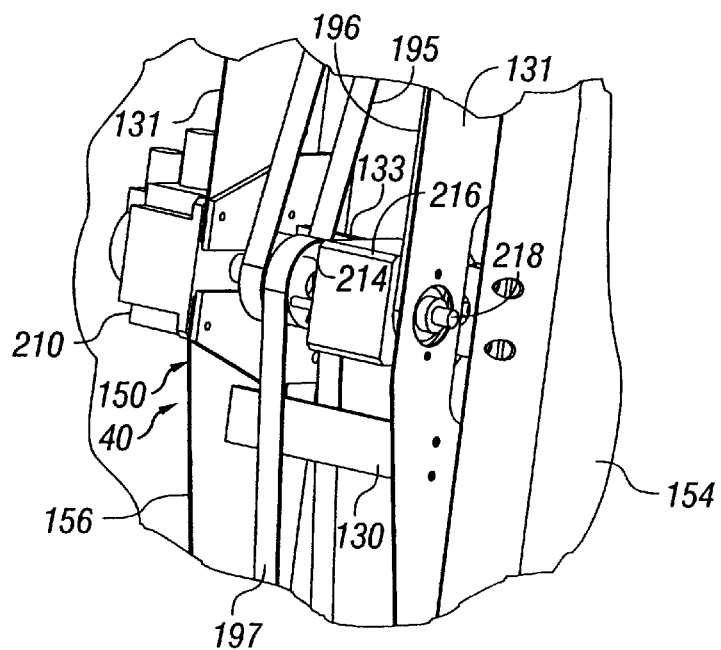
FIG. 12 is a perspective view showing the arrangement of a servomotor and associated drive mechanism for oscillating the spray nozzle assemblies and for pivoting the depending arm section with respect to the base arm section.
Figure 12A:
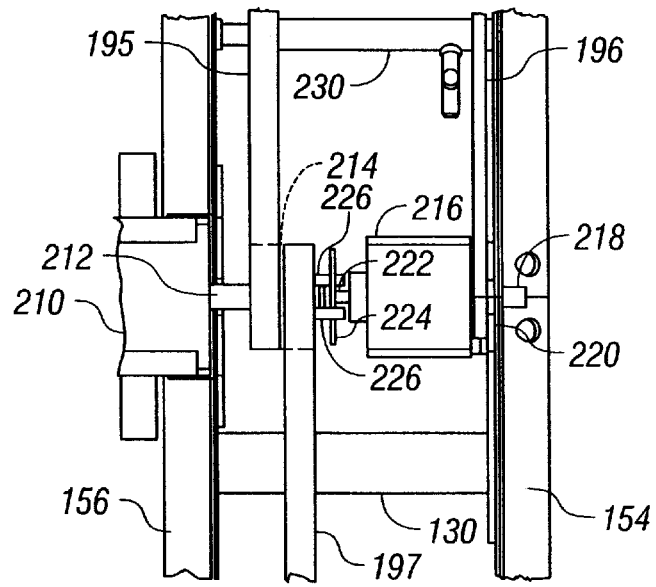
FIG. 12A is a side elevation view of the mechanism shown in FIG. 12 illustrating certain features of a lost motion coupling between the servomotor and a speed reduction gear drive unit.

Referring now to FIGS. 12 and 12A, each of the arms 40 includes an electric servomotor 210 suitably mounted on one of the gussets 131 preferably at an intermediate point on the arm section 150. Servomotor 210 includes a rotary output shaft 212, FIG. 12A, drivenly connected to pulley 214 over which endless belts 195 and 197 are also suitably trained. A speed reduction gear drive unit 216 is mounted on a cross brace member 133 extending between the beam members 154 and 156 of the arm section 150. An output shaft 218 of the speed reduction gear drive 216 is drivingly connected to a pulley 220 over which the endless cog belt or chain 196 is trained.

Referring further to FIG. 12A, the speed reduction gear drive unit 216 includes an input shaft 222 on which is mounted an elongated flat plate 224 extending equidistant on opposite sides of the axis of shaft 222 and between spaced apart pins 226. Pins 226 extend axially from one side of pulley 214. Pins 226 are preferably spaced apart on opposite sides of the axis of rotation of coaxial shafts 212 and 222 about one hundred eighty degrees and form, together with the plate 224, a lost motion coupling which allows the output shaft 212 and pulley 214 to rotate through an arc of about one hundred degrees before drivingly engaging the input shaft 222 to the speed reduction gear drive unit 216. Accordingly, the servomotor 210 may be operated to oscillate the shaft 212 and pulley 214 and, through the series of endless belts 192, 194, 195, 197, 202 and 206, the nozzle assemblies 200*a*, 200*b*, 200*c*, 200*d* and 204 are also oscillated at a predetermined rate.

When it is desired to move the arm section 150 relative to the arm section 122 about the pivot assembly 152, the motor 210 may be controlled to rotate shaft 212 continuously in one direction or the other and through the lost motion coupling formed by the pins 226 and the plate 224, the gear drive unit 216 will effect rotation of its output shaft 218 and pulley 220. However, since pulley 188 is normally fixed to shaft 166, which is fixed to the arm section 122 nonrotatably relative thereto, the reaction torque exerted through the gear drive unit 216 and the arm section 150 will result in rotation of the arm section 150 relative to the arm section 122 to a selected position for "sizing" the arms 40 with respect to a vehicle parked in the bay 36. The gear reduction ratio for the drive mechanism 216 may be relatively high, on the order of 30:1, for example. In this way, the pulleys 214 and the drive pulleys of each of the nozzle assemblies 200*a*, 200*b*, 200*c* and 200*d*, as well as the pulley 208 for the nozzle assembly 204 will undergo several revolutions which is desirable for lubricating and flexing their seals and bearings, respectively.

Referring now to FIG. 11A, the pulley 188 includes a hub 189 which is normally secured against rotation relative to the shaft 166 by a suitable detent plunger 189*a*. Plunger 189*a* is disposed in a suitable housing 189*b* which is threadedly connected to the hub 189 and supports a suitable spring 189*c* therein and acting against the detent 189*a*. Detent 189*a* is normally biased into a recess 166*a* in shaft 166 to form a coupling between the pulley 188 and the shaft to prevent relative rotation between these members. A detent plunger type sensor 189*e* is mounted on the hub 189 and is also engageable with a suitable recess in shaft 166 to detect relative movement between the hub 189 and the shaft. Accordingly, if an arm section 150 of an arm 40 comes into contact with a portion of a vehicle with sufficient force that the detent 189*a* is displaced out of shaft recess 166*a*, the arm section 150 will rotate relative to arm section 122 without damage to the arm sections, the pulley 188, the belt 196 or the drive assembly including the servomotor 210 and the gear reduction drive unit 216. Moreover, if unwanted displacement of an arm section 150 occurs with respect to an arm section 122, sensor 189*e* will be operable to provide a suitable signal to a control system for the washing system 20 to alert operating personnel or cause the system to shut down until any collision between a vehicle and the arm section 150 has been corrected.

Figure 13:
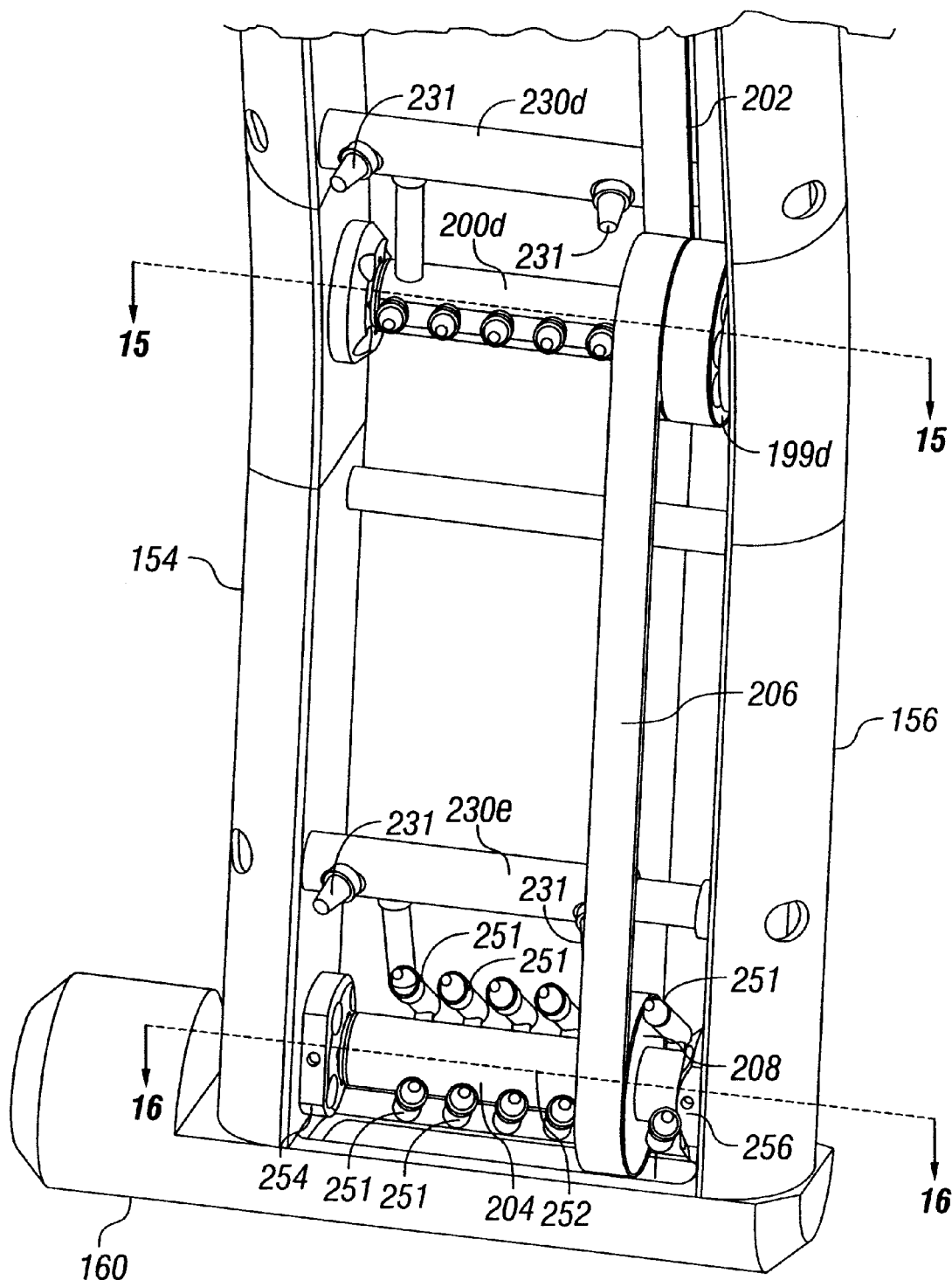
FIG. 13 is a detail perspective view of a lower. portion of one of the nozzle support arms.

Referring further to FIGS. 6 and 13, each of the arms 40 includes the aforementioned spaced apart sets of fixed spray nozzle support members 230*a*, 230*b*, 230*c*, 230*d* and 230*e*, FIG. 6. The members 230*a* through 230*e* are suitably fixed to the arm sections 122 and 150, respectively, interconnecting the beam members of the arm sections and preferably include at least two spaced apart nozzles 231 on each nozzle support member aimed at a vehicle disposed between the arms 40. The spray nozzle support members 230*a*, 230*b*, 230*c*, 230*d* and 230*e* are suitably connected to a fluid supply conduit, not shown, for supplying pressure fluid, such as a washing solution, to the respective nozzles 231. However, the oscillating nozzle assemblies 200*a*, 200*b*, 200*c*, 200*d* and 204 of each arm 40 are supplied with high pressure rinse water for most wash applications. Nozzle assemblies 204 on each of the arms 40 are supplied through conduit 139 and passages 126*a* and 154*a* within the arm sections 122 and 150 via the passages in the pivot assembly 152 for supplying high pressure fluid to the nozzle assembly 204. Conduit 142 supplies high pressure fluid through swivel 140, FIG. 7 of each arm 40, the associated passages in the block 124, and passages 128*a* and 156*a* to respective ones of the nozzle assemblies 200*a*, 200*b*, 200*c* and 200*d*.

Figure 14:
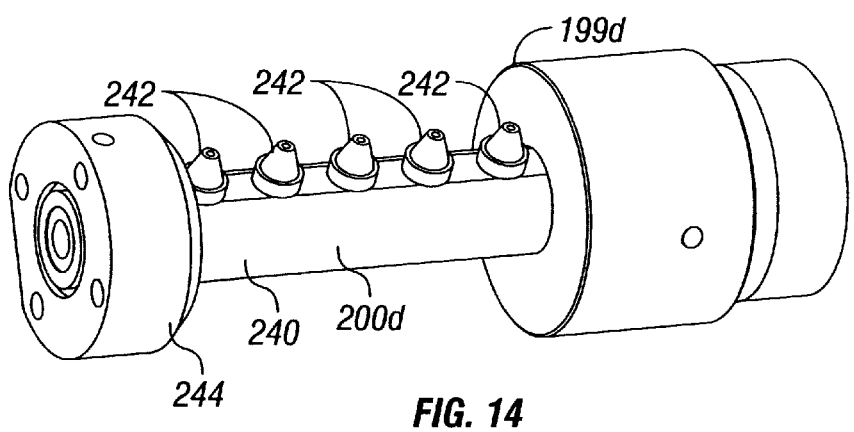
FIG. 14 is a detail perspective view of one of the nozzle assemblies.

Referring now to FIGS. 14 and 15, nozzle assembly 200*d* is shown in further detail by way of example. Nozzle assemblies 200*a*, 200*b* and 200*c* are essentially identical to nozzle assembly 200*d*. Nozzle assembly 200*d* includes an elongated generally cylindrical tubular manifold 240 on which is mounted spaced apart spray nozzles 242. Manifold 240 is fixed to pulley 199*d* for rotation therewith. A bearing support plate 244 supports a reduced diameter trunnion 240*a* of manifold 240, FIG. 15, through a suitable sealed rolling element bearing 246. Suitable o-ring seals provide sealing between trunnion 240*a* and plate 244. A second bearing support plate 248 supports the opposite end of manifold 240 through a double row rolling element bearing assembly 250, FIG. 15, which journals a plug 240*b* secured to manifold 240, as shown. Bearing support plates 244 and 248 are adapted to be suitably connected to the beam members 154 and 156, respectively, by suitable mechanical fasteners, not shown. As further shown in FIG. 15, manifold 240 includes an interior chamber 241 in fluid flow communication with passage 154*a* in beam member 154 by way of a connecting passage 243 in trunnion 240*a* and a passage 154*b*. Accordingly, each of the nozzle assemblies 200*a*, 200*b*, 200*c* and 200*d* receives high pressure fluid from the passages 126*a* and 154*a* while the nozzle assemblies 204 receive all of their fluid through the passages 128*a* and 156*a* in the respective arms 40.

Referring briefly to FIG. 13, each nozzle assembly 204 includes dual sets of spray nozzles 251 mounted on a tubular manifold 252 supported between bearing plates 254 and 256. Contrary to the configuration of the nozzle assembly 200*d*, the manifold 252 is configured to receive pressure fluid from passage 156*a* rather than passage 154*a*. In most other respects, the construction of the nozzle assembly 204 is substantially like that of the nozzle assemblies 200*a*, 200*b*, 200*c* and 200*d*, except for the provision of opposed rows of nozzles 251 instead of a single row of nozzles 242.

Figure 16:
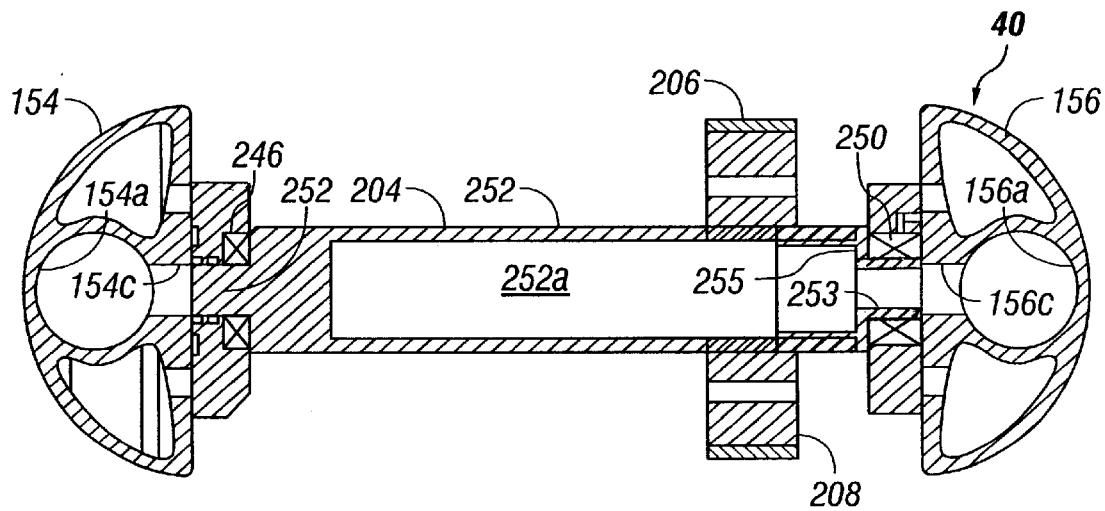
FIG. 16 is a detail section view of one of the vehicle wheel and rocker panel spray nozzle assemblies taken from line 16—16 of FIG. 13.

FIG. 16 illustrates the construction of the cylindrical tubular manifold 252 which is somewhat like the manifold 240 but includes a longitudinal internal passage 252*a* in fluid flow communication with nozzles 251, FIG. 13. An internal passage 253 is formed in a manifold end plug. 255 and opens to passage 252*a* for conducting high pressure washing fluid thereto from passages 156*c* and 156*a*. An opposite end trunnion 252*b*, of manifold 252 is not provided with a through passage, as shown in FIG. 16. Accordingly, separate flow paths for washing fluids at different pressures or using different chemical compositions are provided within the structure of the arms 40 thanks to the configuration of the arms, the pivot assemblies 152 the beam members 126, 128, 154 and 156 and the rotatable and oscillating nozzle assemblies supported thereon, respectively.

The construction and operation of the vehicle washing system 20 is believed to be understandable to those of skill in the art from the foregoing description. However, a brief description of operation of the system 20 is set forth below.

The vehicle washing system 20 is provided with suitable electrical controls, not shown, for operating the motors 76, 106, the motor driven fan 110, the servo motor 210 and respective pumps and valves, not shown, for controlling the flow of washing fluids to the respective nozzle assemblies on the arms 40. The washing system 20 may include suitable sensors mounted on the arms 40 for detecting the presence of a motor vehicle on the driveway 38, as well as the width and length of the vehicle, to affect sizing of the arms 40 by actuating the motors 210 to rotate continuously in one direction or the other until the arm sections 150 are pivoted into positions in proximity to the sides of the vehicle as required according to vehicle width. Motor 106 is operated periodically to rotate the respective arms 40 about their pivot axis 41 and 42 so that the arms may be positioned to wash opposite ends of the vehicle as the system 20 traverses along the guide and support rails 30 and 32.

Accordingly, when a vehicle is moved into position to be washed, the system 20 may be positioned as shown in FIG. 1. Once the controls for the system sense that the vehicle has stopped, the sizing controls will move the arm sections 150 inwardly or outwardly into proper position along the vehicle sides. The motor 76 may then be operated to move the system 20 to a position along the rails 30 and 32 to one end or the other of the vehicle to begin a washing cycle or the washing cycle may begin at any selected start position. Once the starting position is reached, washing fluids are pumped through the nozzles 231 for each nozzle assembly 230a through 230e as the motor 76 is operated to traverse the system 20 along the vehicle. When suitable sensors on the arms 40 sense that the system has reached the ends of the vehicle, the motor 106 may be operated to pivot the arms 40 about their respective pivot axes to wash the ends of the vehicle and then return to the position shown in FIGS. 1 and 4. After the portion of the washing cycle is completed, which results in complete coverage of the vehicle by applying washing fluid from the nozzle assemblies 230a through 230c, for example, the cycle of traversing the system with respect to the vehicle is repeated while operating the motor 210 for each arm 40 to oscillate the nozzle assemblies 200a, 200b, 200c, 200d and 204 while pumping high pressure rinse water therethrough to thoroughly rinse the vehicle. The nozzle assemblies 204 are configured with the opposed angled sets of nozzles 251 to provide superior washing action on the lower portions of the vehicle chassis, the wheels and the rocker panels.

Conventional materials may be used to construct the washing system 20 known to those skilled in the art of vehicle washing systems. At any time while the system 20 is operating, the motor driven fan 110 is operable to pump heated low pressure air into the enclosure 39 for the frame 22 to avoid fluid spray from entering the enclosure and wetting the components disposed therein.

Although a preferred embodiment of a vehicle washing system has been described in detail herein, those skilled in the art will recognize that various substitutions and modifications may be made to the embodiment described without departing from the scope and spirit of the appended claims.

What is claimed is:

1. A vehicle washing system comprising:
a frame including spaced apart drive wheels mounted thereon for traversing said washing system linearly in opposite directions;
a pair of opposed arms mounted on said frame for pivotal movement on said frame, respectively, each of said arms including a first section supported by said frame for pivotal movement thereon and a second section connected to said first section for pivotal movement with respect to said first section; and
plural nozzle assemblies on said second sections of said arms, respectively, and operable to receive pressure fluid through conduit means on said arms for ejecting fluid onto a vehicle to be washed.

2. The washing system set forth in claim 1 wherein:
said frame is mounted on spaced apart support rails extending along a driveway for said vehicle on opposite sides thereof and above the surface of said driveway.

3. The washing system set forth in claim 2 wherein:
said frame includes a transverse bridge section and opposed end support sections for supporting said bridge section, said end support sections including spaced apart guide rollers engagable with said rails for guiding movement of said washing system along said rails, and said drive wheels being connected to said support sections for supporting said frame on and drivingly engaging said rails, respectively.

4. The washing system set forth in claim 3 wherein:
said drive wheels are interconnected with each other by a drive train including a motor.

5. The washing system set forth in claim 4 wherein:
said drive train comprises an elongated shaft mounted on said bridge section and drive mechanism interconnecting said shaft with respective ones of said drive wheels, said shaft being drivenly connected to said motor.

6. The washing system set forth in claim 1 wherein:
each of said arms includes a pivot shaft supported in bearings mounted on said frame, said pivot shafts being interconnected for movement in opposite directions, and said washing system includes a drive motor for said pivot shafts drivingly connected to at least one of said pivot shafts for pivoting said arms in opposite directions in response to operation of said drive motor.

7. The washing system set forth in claim 1 wherein:
said frame includes an enclosure for said bridge section and said end support sections, and said washing system includes a low pressure air pressurization system including a blower for providing low pressure air to pressurize the interior of said enclosure.

8. The washing system set forth in claim 7 wherein:
said blower is mounted remote from a wash bay containing said washing system, and said air pressurization system includes flexible conduit means connected to said blower and to said enclosure for conducting low pressure air to said enclosure to minimize wetting of components of said washing system supported on said frame.

9. The washing system set forth in claim 1 wherein:
said arms include spaced apart nozzle assemblies mounted thereon for oscillatory movement with respect to said arms, said nozzle assemblies being interconnected by a drive train for driving said nozzle assemblies to oscillate to move a spray pattern of washing fluid discharged onto a vehicle.

10. The washing system set forth in claim 9 wherein:
said drive train includes plural endless belts trained over nozzle pulleys mounted on said nozzle assemblies, respectively.

11. The washing system set forth in claim 10 including:
a servomotor operably connected to said drive train for said nozzle assemblies for oscillating said nozzle assemblies, respectively.

12. The washing system set forth in claim 10 wherein:
each of said arms includes a first arm section including a pivot shaft mounted for pivotal movement on said frame and a second arm section mounted on said first arm section for pivotal movement with respect to said first arm section about a pivot assembly.

13. The washing system set forth in claim 12 wherein:
said pivot assembly includes a pivot shaft, a pulley mounted on said pivot shaft and drivenly connected to at least one of said belts for respective ones of said nozzle assemblies for transferring driving forces to a nozzle assembly mounted on said first section of said arm.

14. The washing system set forth in claim 12 wherein:
said pivot assembly is drivenly connected to a servomotor mounted on one of said sections of said arm and operable in response to rotation of an output shaft of said servomotor to effect pivotal movement of said second section of said arm relative to said first section.

15. The washing system set forth in claim 14 wherein:
said pivot assembly includes a drive pulley mounted thereon and fixed with respect to said first section of said arm, and an endless belt interconnecting said drive pulley with a drive mechanism drivenly connected to said servomotor for effecting pivotal movement of said second section of said arm in response to rotation of said servomotor in a selected direction.

16. The washing system set forth in claim 15 wherein:
said pivot assembly includes a breakaway coupling between said drive pulley on said pivot assembly and said pivot assembly.

17. The washing system set forth in claim 15 including:
opposed bearing assemblies supporting said manifold for oscillatory and rotating movement, said bearing assemblies being adapted to be secured to respective ones of said beam members.

18. The washing system set forth in claim 1 wherein:
each of said arms includes opposed spaced apart beam members interconnected to each other and pairs of said beam members forming first and second arm sections, respectively, each of said beam members of each of said arm sections including an elongated fluid conducting passage formed therewithin and operable to be in fluid flow communication with one end of said first section and with respective ones of said nozzle assemblies.

19. The washing system set forth in claim 18 wherein:
said nozzle assemblies each include a manifold supported for rotary oscillating movement between said beam members of said arms, and said nozzle assemblies include plural nozzles mounted on said manifold and a passage formed in said manifold and in communication with said passage in one of said beam members for receiving washing fluid therefrom.

20. The washing system set forth in claim 1 including:
spaced apart lighting fixtures mounted on said frame for lighting an area occupied by said vehicle during washing of said vehicle.

21. A vehicle washing system comprising:
opposed generally parallel elongated support rails disposed along a driveway for a vehicle to be washed, said support rails being mounted a predetermined distance substantially above said driveway;
a frame mounted on said rails for linear traversal therealong, said frame including a transverse bridge section and opposed end support sections for supporting said bridge section, said end support sections being mounted on respective support wheels supported on said rails, respectively for linear traversal along said support rails; and
a drive mechanism mounted on said frame and driveably connected to said drive wheels, respectively, for driving said washing system along said rails in opposite directions.

22. The washing system set forth in claim 21 wherein:
said end support sections support spaced apart guide rollers engageable with said support rails for guiding movement of said washing system therealong.

23. The washing system set forth in claim 21 wherein:
said frame supports a drive motor operably connected to a drive train comprising an elongated shaft mounted on said bridge section and drive mechanism interconnecting said shaft with respective ones of said drive wheels.

24. The washing system set forth in claim 21 including:
a pair of opposed arms mounted on said bridge section and operably connected to a drive mechanism for movement in opposite directions and for supporting washing system spray nozzles in such a way as to provide for spraying washing fluids on opposed sides and opposed ends of a vehicle.

25. The washing system set forth in claim 24 wherein:
each of said arms includes a pivot shaft supported in bearings mounted on said bridge section and said washing system includes a drive motor operably connected to said pivot shafts and mounted on said bridge section for pivoting said arms in opposite directions in response to operation thereof.

26. The washing system set forth in claim 21 wherein:
said frame includes an enclosure for said bridge section and said end support sections, respectively.

27. The washing system set forth in claim 26 including:
an air pressurization system for providing pressure air to pressurize the interior of said enclosure.

* * * * *